United States Patent [19]
Bertolacini et al.

[11] Patent Number: 4,542,116
[45] Date of Patent: Sep. 17, 1985

[54] CATALYST FOR REMOVING SULFUR OXIDES FROM A GAS

[75] Inventors: Ralph J. Bertolacini, Naperville; Eugene H. Hirschberg, Park Forest; Frank S. Modica, Downers Grove, all of Ill.

[73] Assignee: The Standard Oil Company, Chicago, Ill.

[21] Appl. No.: 491,121

[22] Filed: May 3, 1983

Related U.S. Application Data

[62] Division of Ser. No. 363,269, Mar. 29, 1982, Pat. No. 4,405,443.

[51] Int. Cl.$^4$ ............................................. B01J 29/06
[52] U.S. Cl. .......................................... 502/65; 502/73
[58] Field of Search ...................................... 502/65, 73

[56] References Cited

U.S. PATENT DOCUMENTS

| | | | |
|---|---|---|---|
| 3,533,939 | 10/1970 | Coonradt et al. | 502/65 X |
| 4,221,677 | 9/1980 | Vasalos et al. | 502/65 |
| 4,369,130 | 1/1983 | Bertolacini et al. | 502/65 |
| 4,399,059 | 8/1983 | Chu | 502/73 |

Primary Examiner—Carl F. Dees
Attorney, Agent, or Firm—Scott H. Brown; Fred E. Hook

[57] ABSTRACT

Sulfur oxides are removed from a gas by an absorbent comprising at least one inorganic oxide selected from the group consisting of the oxides of aluminum, magnesium, zinc, titanium, and calcium in association with yttrium or yttrium combined with at least one free or combined rare earth metal selected from the group consisting of lanthanum, cerium, praseodymium, samarium, and dysprosium, wherein the ratio by weight of inorganic oxide or oxides to yttrium or yttrium combined with a rare earth metal or metals is from about 0.1 to about 30,000. Absorbed sulfur oxides are recovered as a sulfur-containing gas by contacting the spent absorbent with a hydrocarbon in the presence of a hydrocarbon cracking catalyst at a temperature from about 375° to about 900° C. The absorbent can be circulated through a fluidized catalytic cracking process together with the hydrocarbon cracking catalyst to reduce sulfur oxide emissions from the regeneration zone thereof.

15 Claims, 2 Drawing Figures

CATALYST FOR REMOVING SULFUR OXIDES FROM A GAS

This is a division, of application Ser. No. 363,269, filed Mar. 29, 1982 now U.S. Pat. No. 4,405,443.

BACKGROUND OF THE INVENTION

1. Field of the Invention

This invention relates to a process for reducing the sulfur oxide content of a waste gas stream by using absorbents which can be reactivated for further absorption of sulfur oxides by contact with a hydrocarbon in the presence of a hydrocarbon cracking catalyst. More particularly, this invention relates to a method for reducing sulfur oxide emissions from the regenerator of a fluidized catalytic cracking unit.

2. Setting of the Invention

A major industrial problem involves the development of efficient methods for reducing the concentration of air pollutants, such as sulfur oxides, in the waste gases which result from the processing and combustion of sulfur containing fuels. The discharge of these waste gases into the atmosphere is environmentally undesirable at the sulfur oxide concentrations which are frequently encountered. For example, such waste gases result from combustion of sulfur containing fossil fuels for the generation of heat and power, the regeneration of catalysts employed in the refining of hydrocarbon feedstocks which contain organic sulfur compounds, and the operation of Claus-type sulfur recovery units.

Two basic approaches have been suggested for the removal of sulfur oxides from a waste gas. One approach involves scrubbing the waste gas with an alkaline material, such as lime or limestone, which reacts chemically with the sulfur oxides to produce a nonvolatile waste product. This approach requires a large supply of the alkaline scrubbing material, and the resulting reaction waste products may create a solid waste disposal problem. The second basic approach uses sulfur oxide absorbents which can be regenerated either thermally or chemically. The process of this invention is representative of this second approach.

One area of interest for reduction of sulfur oxides from waste gas which uses the second basic approach is cyclic, fluidized catalytic cracking of petroleum. This process involves the cracking of a petroleum feedstock in a reaction zone through contact with fluidized solid particles of a cracking catalyst. The cracking catalyst becomes substantially deactivated by nonvolatile coke deposits and is separated from the reaction zone effluent and stripped of volatile deposits in a stripping zone. The stripped cracking catalyst particles are separated from the stripping zone effluent, regenerated in a regeneration zone by combustion of the coke with an oxygen containing gas, and thereafter the regenerated catalyst particles are returned to the reaction zone. If sulfur-containing feedstocks are used in this process, the cracking catalyst will become deactivated through the formation of sulfur-containing deposits of coke. In conventional processes, the combustion of this sulfur-containing coke results in the release of substantial amounts of sulfur oxides to the atmosphere.

Various methods have been used to reduce sulfur oxide emissions by utilizing different types of reactants with the cracking catalyst. A commonly utilized reactant is an alumina matrix combined with rare earth metals. Many other metals have been tried; however, to the best of our knowledge yttria (an oxide of yttrium) has never been used as a reactant for this disclosed purpose.

U.S. Pat. No. 3,835,031, to R. J. Bertolacini et al. discloses a method for the reduction of the sulfur oxide emissions through the use of a cracking catalyst comprising a zeolite in a silica-alumina matrix which has from about 0.25 to about 5.0 weight percent of a Group IIA metal or mixture of Group IIA metals distributed over the surface of the matrix and present as an oxide or oxides. The metal oxide or oxides react with sulfur oxides in the regeneration zone to form nonvolatile inorganic sulfur compounds. These nonvolatile inorganic sulfur compounds are then converted to the metal oxide or oxides and hydrogen sulfide upon exposure to hydrocarbons and steam in the reaction and stripping zones of the process unit. The resulting hydrogen sulfide is disposed of in equipment conventionally associated with a fluid catalytic cracking unit. Similarly, Belgian Pat. No. 849,637 also is directed to a process wherein a Group IIA metal or metals is circulated through a cyclic fluidized catalytic cracking process in order to reduce the sulfur oxide emissions resulting from regeneration of deactivated catalyst. These patents do not suggest the use of yttrium or combining yttrium with a rare earth metal for use as a reactant.

Belgian Pat. No. 849,636 and its counterpart, U.S. patent application Ser. No. 748,556, disclose a process similar to that set forth in U.S. Pat. No. 3,835,031, which involves the removal of sulfur oxides from the regeneration zone flue gas of a cyclic, fluidized, catalytic cracking unit through the use of a zeolite-type cracking catalyst in combination with a regenerable metallic reactant. The reactant absorbs sulfur oxides in the regeneration zone and releases the absorbed sulfur oxides as hydrogen sulfide in the reaction and stripping zones of the process unit. It is taught therein that a suitable metallic reactant comprises one or more members selected from the group consisting of sodium, scandium, titanium, chromium, molybdenum, manganese, cobalt, nickel, antimony, copper, zinc, cadmium, the rare earth metals, and lead, all in free or combined form. In addition, it is disclosed that the metallic reactant may be supported by an amorphous cracking catalyst or a solid which is substantially inert to the cracking reaction. Silica, alumina and mixtures of silica and alumina are mentioned as suitable supports. There is no specific teaching, however, of the desirability of combining any particular rare earth metals with inorganic oxides selected from the group consisting of the oxides of alumium, magnesium, zinc, titanium and calcium. There is no mention of the use of yttrium as a suitable reactant. Further, the disclosure contains no suggestion that such a combination would afford a synergistically enhanced reduction of regenerator sulfur oxide emissions.

Belgian Pat. No. 849,635 and its counterpart, U.S. patent application Ser. No. 748,555 are also directed to a similar process to U.S. Pat. No. 3,835,031 and Belgian Pat. No. 849,636, and teaches that an improved reduction of regeneration zone sulfur oxide emissions can be achieved by combining a sulfur oxide absorbent with a metallic promoter, including platinum and palladium. The sulfur oxide absorbent comprises at least one free or combined element which is selected from the group consisting of sodium, magnesium, calcium, strontium, barium, scandium, titanium, chromium, molybdenum manganese, cobalt, nickel, antimony, copper, zinc, cadmium, lead and the rare earth metals. Although the metallic promoter enhances the ability of the absorbent to absorb sulfur oxides in the regeneration zone of a cyclic, fluidized, catalytic cracking unit, the more active promoters, such as platinum and palladium, also promote the formation of nitrogen oxides and the combustion of carbon monoxide in the regeneration zone. Since the discharge of nitrogen oxides into the atmosphere is environmentally undesirable, the use of these promoters is unattractive. The ability of these promoters to enhance the combustion of carbon monoxide in the regenerator is also undesirable in those situations wherein the regenerator vessel and associated equipment, such as cyclones and flue gas lines, are constructed of metals, such as carbon steel, which may not be able to tolerate the increased regeneration temperatures which can result from enhanced carbon monoxide combustion. It is not disclosed therein to use yttrium as a reactant to reduce sulfur oxide emissions.

U.S. Pat. No. 4,146,463 to H. D. Radford et al. discloses a process wherein a waste gas which includes sulfur oxides and/or carbon monoxide is conveyed to the regeneration zone of a cyclic, fluidized, catalytic cracking unit wherein it is contacted with a metal oxide which reacts with the sulfur oxides to form nonvolatile inorganic sulfur compounds. This patent teaches that suiLable metal oxides include those selected from the group consisting of the oxides of sodium, the Group IIA metals, scandium, titanium, chromium, iron, molybdenum, manganese, cobalt, nickel, antimony, copper, zinc, cadmium, lead and the rare earth metals. In addition, the patent teaches that the metal oxide may be incorporated into or deposited onto a suitable support such as silica, alumina and mixtures of silica and alumina. The teaching of this patent fails to suggest the use of yttrium with one or more inorganic oxides selected from the group consisting of the oxides of aluminum, magnesium, zinc, titanium and calcium.

U.S. Pat. No. 4,071,436 to W. A. Blanton et al. teaches that alumina and/or magnesia can be used to absorb sulfur oxides from a gas and the absorbed sulfur oxides can be removed by treatment with a hydrocarbon. It is further disclosed therein that sulfur oxide emissions from the regenerator of a cyclic, fluidized, catalytic cracking unit can be reduced by combining alumina and/or magnesia with the hydrocarbon cracking catalyst. Similarly, U.S. Pat. Nos. 4,115,249 and 4,115,251 teach the utility of alumina or aluminum to absorb sulfur oxides in the regenerator of a cyclic, fluidized, catalytic cracking unit. The disclosures of these patents do not, however, mention yttrium or rare earth metals in combination with alumina and/or magnesia to give improved results.

U.S. Pat. No. 4,001,375 to J. M. Longo discloses a process for removal of sulfur oxides from a gas which involves absorbing the sulfur oxides with cerium oxide followed by regeneration of the spent cerium oxide by reaction with hydrogen gas. It is further disclosed that the cerium oxide may be supported on an inert support such as alumina, silica and magnesia. The patent does not, however, suggest that the use of another type of reactant, such as yttrium, or that the spent cerium oxide could be regenerated by contact with a hydrocarbon in the presence of a hydrocarbon cracking catalyst. In addition, the patent fails to suggest that the reactant can be combined with alumina and/or magnesia to effect an absorption of sulfur oxides.

U.S patent application Ser. No. 29,264 and now abandoned to Bertolacini et al. discloses a composition of material and a process for removal of sulfur oxides from a gas. Specifically, sulfur oxides are removed from a gas by an absorbent comprising an inorganic oxide in association with at least one free or combined rare earth metal. The absorbed sulfur oxides are recovered as a sulfur-containing gas by contacting the spent absorbent with a hydrocarbon in the presence of anydrocarbon cracking catalyst. There is no disclosure in U.S. patent application Ser. No. 29,264 for the use of yttrium as an absorbent in a fluidized catalytic cracking process.

U.S. Pat. No. 4,311,581 discloses an article entitled "Selection of Metal Oxides for Removing $SO_2$ from Flue Gas" by Lowell et al. in Ind. Eng. Chem. Process Des. Develop., Vol. 10, No. 3, 1971, is addressed to a theoretical evaluation of the possible use of various metal oxides to absorb sulfur dioxide from a flue gas. The authors evaluate 47 metal oxides from which they select a group of 16 potentially useful single oxide absorbents, which includes the oxides of aluminum, cerium and titanium. Yttrium was not included in the list. The absorbents are taught to be regenerated thermally and the paper does not consider the possibility of regeneration under reducing conditions. Consequently, there is no suggestion that any of the metal oxides could be regenerated by contact with a hydrocarbon in the presence of a hydrocarbon cracking catalyst.

U.S. Pat. No. 3,899,444 to R. E. Stephens is directed to the preparation of a catalyst support which consists of an inert substrate or core which is coated with an alumina containing from about 1 to about 45 weight percent, based on the alumina, of a rare earth metal oxide which is uniformly distributed throughout the alumina coating. It is disclosed that the inert substrate may include such refractory materials as zirconia, zinc oxide, alumina-magnesia, calcium aluminate, synthetic and natural zeolites among many others. Yttrium is not listed in the list of rare earth metals contemplated. See Col. 5, lines 9–14. Similarly, U.S. Pat. No. 4,062,810 to W. Vogt et al. discloses compositions comprising cerium oxide on an aluminum oxide support. Neither of these patents teach the use of yttrium.

U.S. Pat. No. 3,823,092 to E. M. Gladrow describes the treatment of a zeolite-type hydrocarbon cracking catalyst with a dilute solution containing cerium cations or a mixture of rare earth cations having a substantial amount of cerium in order to improve the regeneration rate of the catalyst. The resulting catalyst contains between about 0.5 and 4.0 percent of cerium oxide and it is further disclosed that the catalyst matrix may contain from 5 to 30% alumina. Similarly, U.S. Pat. No. 3,930,987 to H. S. Grand describes a hydrocarbon cracking catalyst comprising a composite of a crystalline aluminosilicate carrying rare earth metal cations dispersed in an inorganic oxide matrix wherein at least 50 weight percent of the inorganicis silica and/or alumina, and the rare earth metal content of the matrix is from 1 to 6 percent expressed as $Re_2O_3$. At Col. 7, lines 60–64, Grand includes yttrium as a rare earth metal. And at Col. 8, lines 5–21, yttrium is included in rare earth chloride solutions as a very minor substituent, i.e. 0.4% by weight of the diodymium chloride. Nowhere is it disclosed to use yttrium with specific metal oxides as a sulfur oxide absorbent. Also, U.S. Pat. No. 4,137,151 to S. M. Csicsery discloses a composition comprising lanthanum or a lanthanum compound in association with a porous inorganic oxide which may be the matrix of a zeolite-type cracking catalyst. These patents contain no mention of sulfur oxides and fail to suggest that the combination of yttrium or specific rare earth metals with specific metal oxides, such as alumina, could afford an improved sulfur oxide absorbent which can be regenerated by contact with a hydrocarbon in the presence of a hydrocarbon cracking catalyst.

SUMMARY OF THE INVENTION

This invention is directed to a process for removing sulfur oxides from a gas which comprises: (a) absorbing sulfur oxides from the gas with an absorbent which comprises at least one inorganic oxide selected from the group consisting of the oxides of aluminum, magnesium, zinc, titanium and calcium in association with yttrium at a temperature in the range from about 100° to about 900° C., wherein the ratio by weight of inorganic oxide or oxides to yttrium or yttrium with a metal is from about 1.0 to about 1,000, and (b) removing said absorbed sulfur oxides from the absorbent as a sulfur-containing gas, which comprises hydrogen sulfide, by contacting said absorbent with a hydrocarbon in the presence of a hydrocarbon cracking catalyst at a temperature in the range from about 375° to about 900° C.

In one embodiment, the present invention relates to a composition of matter prepared by the solid comprising: (a) impregnating a particulate solid cracking catalyst comprising from about 0.5 to about 50 weight percent of a crystalline aluminosilicate zeolite distributed throughout a matrix, consisting essentially of from about 40 to about 100 weight percent of alumina and from about 0 to about 60 weight percent of silica with yttrium, wherein the amount of the yttrium is sufficient to add from about 0.004 to about 10 weight percent, calculated as the metal or metals, to said catalyst particles; and (b) calcining said impregnated catalyst particles at a temperature between about 200° and about 820° C.

In a further embodiment, the present invention relates to a composition of matter comprising a particulate physical mixture of (a) a particulate solid cracking catalyst for cracking hydrocarbons comprising a crystalline aluminosilicate zeolite distributed throughout a matrix; and (b) a particulate solid, other than said cracking catalyst comprising at least one inorganic oxide selected from the group consisting of the oxides of aluminum, magnesium, zinc, titanium and calcium in association with yttrium, wherein the particulate solid other than cracking catalyst contains at least about 40 weight percent of the inorganic oxide or oxides, the ratio by weight of inorganic oxide or oxides to yttrium is from about 1.0 to about 1000, and said particulate solid other than cracking catalyst comprises from about 0.1 to about 50 weight percent of said particulate physical mixture.

It has been discovered that yttrium and the inorganic oxide or oxides of this invention act together in a synergistic manner to afford a more efficient absorption of sulfur oxides from a gas than is possible if they are used separately. Accordingly, it is an object of this invention to provide an improved composition of matter for use in absorbing sulfur oxides from a gas.

Another obect of this invention is to provide an improved process for removing sulfur oxides from a gas.

DETAILED DESCRIPTION OF THE PREFERRED EMBODIMENTS

Figure 1:
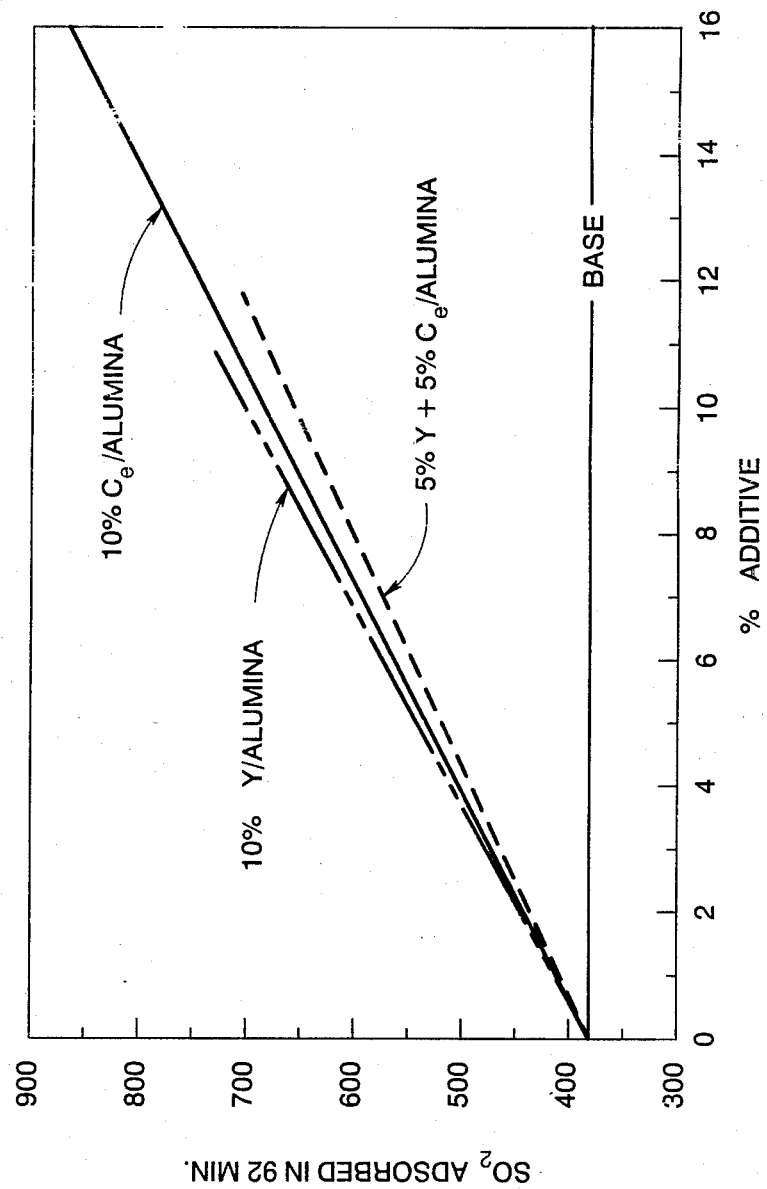
FIG. 1 is a graphical representation of the effect of various additives on SO$_2$ absorption.

It has been discovered that an association of yttrium or a combination of yttrium with at least one free or combined rare earth metal selected from the group consisting of lanthanum, cerium, praseodymium, samarium and dysprosium, with at least one inorganic oxide selected from the group consisting of the oxides of aluminum, magnesium, zinc, titanium and calcium, is a highly efficient absorbent for sulfur oxides, which can be regenerated by contact with a hydrocarbon in the presence of a hydrocarbon cracking catalyst.

Yttrium is a metal commonly found in rare earth ores and has been occasionally referred to as a rare earth metal. Specifically, yttrium is not considered a rare earth metal itself. Yttrium has an atomic number of 39 and therefore does not lie in the rare earth grouping on the elemental periodic table, which have atomic numbers from 57 to 71. Yttrium is found in rare earth ores at a concentration of about 0.04% by weight. See Col. 7, line 60 to Col. 8, line 21 of U.S. Pat. No. 3,930,987. No reference is known which discloses the use of yttrium as an absorbent in a fluidized catalytic cracking process at the concentrations disclosed herein, i.e. the ratio by weight of inorganic oxide or oxides to oxide of yttrium is from about 1.0 to about 30,000. The other disclosure of yttrium in U.S. Pat. No. 3,930,987 does not mention a concentration of yttrium in a fluidized catalytic cracking process.

It has been found that the yttrium and the inorganic oxide or oxides act together in a synergistic manner to absorb sulfur oxides from a gas more efficiently than would be expected from their individual abilities to absorb sulfur oxides. Although the precise mechanism by which this synergism occurs is unclear, it is believed that the yttrium serves both to absorb the sulfur oxides and to assist in the transfer of sulfur oxides to the inorganic oxide. This transfer of sulfur oxides to the inorganic oxide may result from an ability of the yttrium to catalyze the conversion of sulfur dioxide to sulfur trioxide, which is more easily absorbed by the inorganic oxide. The yttrium does not, however, significantly enhance the combustion of carbon monoxide, which may also be present in the waste gas. Consequently, the process of this invention can be used to reduce sulfur oxide emissions from the regenerator of a fluidized, catalytic cracking unit wherein the regenerator vessel and/or associated process equipment, such as cyclones, cannot tolerate the increased temperatures which would result from an enhanced combustion of carbon monoxide. In addition, yttrium unlike metals such as platinum and palladium, does not significantly enhance the formation of nitrogen oxides in the regenerator of a fluidized catalytic cracking unit.

Catalytic cracking of heavy mineral oil fractions is one of the major refining operations employed in the conversion of crude oils to desirable fuel products such as high-octane gasoline fuels used in spark-ignited internal combustion engines. In fluidized, catalytic cracking processes, high molecular weight hydrocarbon liquids or vapors are contacted with hot, finely-divided, solid catalyst particles, either in a fluidized bed reactor or in an elongated riser reactor, and the catalyst-hydrocarbon mixture is maintained at an elevated temperature in a fluidized or dispersed state for a period of time sufficient to effect the desired degree of cracking to low molecular weight hydrocarbons of the kind typically present in motor gasoline and distillate fuels.

Conversion of a selected hydrocarbon feedstock in a fluidized catalytic cracking process is effected by contact with a cracking catalyst, preferably in one or more fluidized transfer line reactors, at conversion temperature and at a fluidizing velocity which limits the conversion time to not more than about ten seconds. Conversion temperatures are desirably in the range from about 430° to about 700° C. and preferably from about 450° to about 650° C. Reactor effluent, comprising hydrocarbon vapors and cracking catalyst containing a deactivating quantity of carbonaceous material or coke, is then transferred to a separation zone. Hydrocarbon vapors are then separated from the spent cracking catalyst and the catalyst stripped in a stripping zone of volatile deposits before regeneration. The stripping zone can be suitably maintained at a temperature in the range from about 430° to about 700° C., preferably from about 450° to about 650° C., and most preferably from about 465° to about 595° C. The preferred stripping gas is steam, although any inert gases, such as nitrogen or flue gases, or mixtures of steam with inert gases can also be used. The stripping gas is introduced at a pressure in the range from about 0.7 to about 2.5 kilograms per square centimeter above atmospheric pressure, and in an amount which is sufficient to effect substantially complete removal of volatile deposits from deactivated cracking catalyst. When steam is employed as the stripping gas, the weight ratio of stripping steam to cracking catalyst is in the range from about 0.0005 to about 0.025 and preferably in the range from about 0.0015 to about 0.0125.

In the catalytic cracking of hydrocarbons, some nonvolatile carbonaceous material or coke is deposited on the catalyst particles. Coke comprises highly condensed aromatic hydrocarbons which generally contain from about 4 to about 10 weight percent of hydrogen. When the hydrocarbon feedstock contains organic sulfur compounds, the coke formed will also contain sulfur. As coke builds up on the cracking catalyst, the activity of the catalyst for "cracking" and the selectivity of the catalyst for producing gasoline blending stocks diminishes. The catalyst can, however, recover a major portion of its original capabilities by removal of most of the coke therefrom in a suitable regeneration process.

In a fluidized catalytic cracking process, stripped deactivated cracking catalyst is regenerated by burning the coke deposits from the catalyst's surfaces with a molecular oxygen-containing regeneration gas, such as air, in a regeneration zone or regenerator. This burning results in the formation of combustion products such as sulfur oxides, carbon monoxide, carbon dioxide and steam. The oxygen containing regeneration gas can contain diluent gases such as nitrogen, steam, carbon dioxide, recycled regenerator effluent and the like. The molecular oxygen concentration of the regeneration gas is ordinarily from about 2 to about 30 volume percent and preferably from about 5 to about 25 volume percent. Since air is conveniently employed as a source of molecular oxygen, a major portion of the inert gas can be nitrogen. The regeneration zone temperatures are ordinarily in the range from about 565° to about 790° C. and are preferably in the range from about 620° to about 735° C. When air is used as the regeneration gas, it usually enters the bottom of the regenerator from a blower or compressor and at a fluidizing velocity in the range from about 0.05 to about 1.5 meters per second and preferably from about 0.15 to 0.90 meters per second. Regenerated catalyst is then recycled to the vertical transfer line reactor for further use in the conversion of hydrocarbon feedstock.

The method of this invention can be used in a fluidized catalytic cracking process with wide variation in the cracking conditions. In the usual case where a gas oil feedstock is employed, the throughput ratio (TPR) or volume ratio of total feed to fresh feed, can vary from about 1.0 to about 3.0. Conversion levels can vary from about 40% to about 100% where conversion is here defined as the percentage reduction of hydrocarbons boiling above 221° C. at atmospheric pressure by formation of lighter materials or coke. The weight ratio of catalyst to oil in the reactor can vary within the range from about 2 to about 20 so that the fluidized dispersion will have a density in the range from about 15 to about 320 kilograms per cubic meter. Fluidizing velocity may be in the range from about 3.0 to about 30 meters per second. This cracking process is preferably effected in a vertical transfer line reactor wherein the ratio of length to average diameter is at least about 25.

A suitable hydrocarbon feedstock for use in a fluidized catalytic cracking process in accordance with this invention can contain from about 0.2 to about 6.0 weight percent of sulfur in the form of organic sulfur compounds. Advantageously, the feedstock contains from about 0.5 to about 5 weight percent sulfur and more advantageously contains from about 1 to about 4 weight percent sulfur wherein the sulfur is present in the form of organic sulfur compounds. Suitable feedstocks include, but are not limited to, sulfur-containing petroleum fractions such as light gas oils, heavy gas oils, wide-cut gas oils, vacuum gas oils, naphthas, decanted oils, residual fractions and cycle oils derived from any of these as well as sulfur-containing hydrocarbon fractions derived from shale oils, tar sands processing synthetic oils, coal liquefaction and the like. Any of these suitable feedstocks can be employed either singly or in any desired combination.

With respect to the effective use of this invention in a fluidized catalytic cracking process, the stripped deactivated cracking catalyst in association with the yttrium or yttrium with rare earth metal-inorganic oxide absorbent is regenerated in the regeneration zone and the sulfur produced by combustion of the sulfur-containing are absorbed by the absorbent. The hydrocarbon feedstock is then cracked in the presence of the regenerated cracking catalyst in association with the yttrium or yttrium with rare earth metal-inorganic oxide absorbent containing absorbed sulfur oxides. During the catalytic conversion of the hydrocarbon feedstock, the absorbed sulfur oxides are substantially released from the absorbent as a sulfur-containing gas comprising hydrogen sulfide. The deactivated cracking catalyst in association with the yttrium or yttrium with rare earth metal-inorganic oxide absorbent is then stripped with a steam containing stripping gas prior to recycle to the regeneration zone. This steam stripping serves not oily to remove volatile hydrocarbon deposits, but also serves to complete the removal of any residual absorbed sulfur oxides from the absorbent as a sulfur-containing gas which comprises hydrogen sulfide and completes the reactivation of the absorbent for further absorption of sulfur oxides in the regeneration zone. The resulting hydrogen sulfide is recovered together with the other volatile products from the reaction and stripping zones and is separated and can be converted to elemental sulfur in facilities which are conventionally associated with a fluidized catalytic cracking unit.

In the practice of this invention, yttrium may be used alone or with at least one free or combined rare earth metal such as lanthanum, cerium, praseodymium, samarium and dysprosium. Lanthanum and cerium are thought to be the most effective rare earth metals for sulfur oxide absorption and cerium is generally more active than lanthanum.

The amount of yttrium utilized as an absorbent can be from about 1.0 wt % to about 15 wt % yttrium to inorganic oxide used as an absorbent, preferably, from about 6.0 wt % to about 12 wt %; and most preferably about 10 wt % to inorganic oxide. When the yttrium is used in combination with a rare earth oxide or oxides the following amounts of yttrium with rare earth oxide or oxides can be utilized: from about 0.5 wt % to about 8 wt % yttrium with from about 0.5 wt % to about 8 wt % of rare earth oxide or oxides to inorganic oxide used as an absorbent; preferably from about 3.0 wt % to about 6 wt % yttrium with from about 3.0 wt % to about 6 wt % rare earth oxide or oxides; and most preferably about 5 wt % yttrium with 5 wt % rare earth oxide or oxides.

In view of the similar chemical properties of the various rare earth elements, it is relatively difficult to separate them or their compounds from each other in pure form. For the practice of this invention, however, it is unnecessary to effect such a separation. A mixture of rare earth metals or compounds thereof of the type which is obtained from natural sources prior to any substantial separation of individual rare earth metals or compounds thereof can be used. Additionally, it is relatively simple to separate a cerium concentrate and a lanthanum concentrate from mixture of rare earth metals, and these concentrates contain a major portion of cerium and lanthanum respectively.

The oxides of yttrium and the rare earth metals are particularly effective in association with the inorganic oxide or oxides of this invention for absorbing sulfur oxides from a gas. Consequently, it is preferable to utilize yttrium and the rare earth metal or metals in the form of the oxide or oxides.

In the practice of this invention, at least one inorganic oxide is employed which is selected from the group consisting of the oxides of aluminum, magnesium, zinc, titanium, and calcium, and preferably at least one inorganic oxide selected from the group consisting of alumina and magnesium oxide is employed, and preferably alumina. Although the use of any form of alumina is contemplated for use in the practice of this invention, gamma-alumina and eta-alumina are preferred because of their usually large surface area.

A preferred embodiment of the inventon involves the use of a mixture of inorganic oxides which comprises at least about 50 percent by weight of alumina. Mixtures of alumina with magnesium oxide and of alumina with zinc oxide are particularly suitable, wherein the weight ratio of alumina to magnesium oxide or zinc oxide is desirably from about 1.0 to about 500, and preferably from about 2.0 to about 100. In these embodiments, the desirable attrition and sulfur oxide releasing properties of alumina are combined with the excellent sulfur oxide absorption properties of the other metal oxides, particularly of magnesium oxide.

The inorganic oxides of this invention generally afford the best results when they have a large surface area. This surface area is desirably greater than about 10 square meters per gram, preferably greater than about 50 square meters per gram and ideally greater than about 100 square meters per gram. Similarly, yttrium and the rare earth metal or metals generally afford the best results when they have a large surface area exposed to the sulfur oxide containing gas as, for example, when the yttrium alone or yttrium with the rare earth metal or metals are deposited on a support having a large surface area. Such a support will have a surface area which is desirably in excess of about 10 square meters per gram, preferably greater than about 50 square meters per gram and ideally greater than about 100 square meters per gram. The larger surface areas are most desirable because of a more efficient contacting of the sulfur oxide containing gas with the solid.

The ratio of inorganic oxide or oxides to yttrium or yttrium with a rare earth metal or metals, calculated as the metal or metals, is desirably from about 0.1 to about 30,000, more desirably from about 1.0 to about 30,000, preferably from about 1.0 to about 1,000, and more preferably from about 2.0 to about 100, and ideally from about 3.0 to about 20. Decreasing the ratio of inorganic oxide or oxides to yttrium or yttrium with rare earth metalor metals generally affords an improved sulfur oxide absorption until a ratio of about 3.0 is reached. Smaller ratios than about 3.0 are not generally undesirable, but do not usually afford significant further improvement in sulfur oxide absorption properties. In addition, these smaller ratios require larger amounts of the metals which will generally be more expensive than the inorganic oxide or oxides.

Suitable hydrocarbon cracking catalysts for use in the practice of this invention include all high-activity solid catalysts which are stable under the required conditions. Suitable catalysts include those of the amorphous silica-alumina type having an alumina content of about 10 to about 60 weight percent. Catalysts of the silica-magnesia type are also suitable which have a magnesia content of about 20 weight percent. Preferred catalysts include those of the zeolite-type which comprise from about 0.5 to about 50 weight percent and preferably from about 1 to about 30 weight percent of a crystalline aluminosilicate component distributed throughout a porous matrix. Zeolite type cracking catalysts are preferred because of their thermal stability and high catalytic activity.

The crystalline aluminosilicate or zeolite component of the zeolite-type cracking catalyst can be of any type or combination of types, natural or synthetic, which is known to be useful in catalyzing the cracking of hydrocarbons. Suitable zeolites include both naturally occurring and synthetic aluminosilicate materials such as faujasite, chabazite, mordenite, Zeolite X (U.S. Pat. No. 2,882,244), Zeolite Y (U.S. Pat. No. 3,130,007), and ultrastable large-pore zeolites (U.S. Pat. Nos. 3,293,192 and 3,449,070). The crystalline aluminosilicates having a faujasite-type crystal structure are particularly suitable and include natural faujasite, Zeolite X and Zeolite Y. These zeolites are usually prepared or occur naturally in the sodium form. The presence of this sodium is undesirable, however, since the sodium zeolites have a low stability under hydrocarbon cracking conditions. Consequently. for use in this invention the sodium content of the zeolite is ordinarily reduced to the smallest possible value, generally less than about 1.0 weight percent and preferably below about 0.3 weight percent through ion exchange with hydrogen ions, hydrogen-precursors such as ammonium ion, or polyvalent metal cations including calcium, magnesium, strontium, barium, yttrium and the rare earth metals such as cerium, lanthanum, neodymium and their mixtures. Suitable zeolites are able to maintain their pore structure under the high temperature conditions of catalyst manufacture, hydrocarbon processing and catalyst regeneration. These materials have a uniform pore structure with the cross-section diameter of the pores being in the range from about 4 to about 20 angstroms preferably from about 8 to about 15 angstroms.

The matrix of the zeolite-type cracking catalyst is a porous refractory material within which the zeolite component is dispersed. Suitable matrix materials can be either synthetic or naturally ocurring and include, but are not limited to, silica, alumina, magnesia, boria, bauxite, titania, natural and treated clays, kieselguhr, diatomaceous earth, kaoline and mullite. Mixtures of two or more of these materials are also suitable. Particularly suitable matrix materials comprise mixtures of silica and alumina, mixtures of silica with alumina and magnesia and also mixtures of silica and alumina in combination with natural clays and clay-like materials. Mixtures of silica and alumina are preferred, however, and contain preferabiy from about 10 to about 65 weight percent of alumina mixed with from about 35 to about 90 weight percent of silica, and more preferably from about 25 to about 65 weight percent of alumina mixed with from about 35 to about 75 weight percent of silica.

In the practice of this invention, yttrium which is associated with one or more suitable inorganic oxides, are preferably used in a form which does not involve chemical incorporation within a zeolite.

In the practice of this invention, yttrium and inorganic oxide or oxides can be combined in any suitable manner and can be additionally combined with the hydrocarbon cracking catalyst. These materials, for example, can be combined and shaped into pellets or extrudates of any desired shape. In a highly preferred embodiment, the yttrium or yttrium with a rare earth metal or metals, the inorganic oxide or oxides, and the hydrocarbon cracking catalyst are employed in the form of particulate fluidizable solids. In this embodiment, the particles should be sufficiently strong that they are not subject to excessive attrition and degradation during fluidization. The average size of the solid particles will be desirably in the range from about 20 microns or less to about 150 microns, and preferably less than about 50 microns. The use of fluidized solids provides a highly efficient technique for contacting a gas with a solid or solids as is required in the practice of the process of this invention. Consequently, the use of fluidized solids affords a very efficient method of contacting the yttrium and inorganic oxide or oxides of this invention with a gas which contains sulfur oxides. Similarly, the use of fluidized solids also provides an efficient method of contacting the spent yttrium-inorganic oxide absorbent with a hydrocarbon in the presence of a cracking catalyst to remove the absorbed sulfur oxides.

When particulate solids are used in the practice of this invention, the particles of cracking catalyst can contain both yttrium and inorganic oxide or oxides. Alternatively, the particles of cracking catalyst can contain yttrium and be physically mixed with a separate particulate solid which comprises the inorganic oxide or oxides. As a further alternative, the particles of cracking catalyst can contain the inorganic oxide or oxides and be physically mixed with a separate particulate solid which comprises yttrium. In addition, a physical mixture of different particulate solids can also be employed wherein one particulate solid comprises the cracking catalyst, yttrium comprise the second particulate solid, and the inorganic oxide or oxides comprise the third particulate solid. It will, of course, be appreciated that combinations of these alternatives are also possible.

The inorganic oxide or oxides of this invention can comprise a portion of a cracking catalyst as, for example, in the case of a silica-alumina or silica-magnesia catalyst. Also, the inorganic oxide or oxides of this invention can comprise at least a portion of the matrix of a zeolite-type cracking catalyst. A particularly preferred embobiment of this invention comprises the use of alumina as the inorganic oxide, which is provided in the form of a zeolite-type cracking catalyst having alumina in its matrix.

The use of a zeolite-type cracking catalyst having a high alumina matrix, for example in excess of about 40 weight percent, provides a highly convenient manner in which to provide the inorganic oxide of this invention. As the alumina content of the matrix increases, the ability of the cracking catalyst to absorb sulfur oxides in accordance with this invention also increases.

The inorganic oxide or oxides and yttrium of this invention can be in the form of a fluidizable powder which is admixed with a particulate cracking catalyst. Illustrative of such powders are alumina magnesia, titania, zinc oxide, calcium oxide, cerium oxide, lanthanum oxide and mixed rare earth oxides comprising cerium and/or lanthanum.

As described above, yttrium as well as the inorganic oxide or oxides can be incorporated into or deposited onto a suitable support. Suitable supports include, but are not limited to, amorphous cracking catalysts, zeolite-type cracking catalysts, silica, alumina, mixtures of silica and alumina, magnesia, mixtures of silica and magnesia, mixtures of alumina and magnesia, mixtures of alumina and magnesia with silica, titania, zinc oxide, calcium oxide, natural and treated clays, kieselguhr, diatomaceous earth, kaolin and mullite. Such support preferably comprises at least one of the inorganic oxides of this invention. Suitable supports for the inorganic oxide or oxides can be silica, natural and treated clays, kieselguhr, diatomaceous earth, kaolin and mullite. Also an inorganic oxide can be a support for one or more other inorganic oxides. Desirably, the support is porous and has a surface area, of at least about 10 square meters per gram, preferably at least about 50, and most preferably at least about 100 square meters per gram. Large surface areas are desirable because of a more efficient contacting of the sulfur oxide containing gas with the solid.

Yttrium and/or inorganic oxide or oxides of this invention can be combined with a support either during or after preparation of the support. One method consists of impregnating a suitable support with an aqueous or organic solution or dispersion of a compound or compounds of yttrium and/or metal or metals of the inorganic oxide or oxides. The impregnation can be carried out in any manner which will not destroy the structure of the support. After drying, the composite can be calcined to afford the supported rare earth metal or metals and/or inorganic oxide or oxides of the invention. Preferably, nitrates, carbonates and salts of organic acids such as acetates are employed in the impregnating solution or dispersion, particularly if a cracking catalyst is used as the support, since the residue from the thermal decomposition of these salts is relatively innocuous to the activity of a hydrocarbon cracking catalyst. The halogen and sulfate salts can also be used, but the by-products produced during thermal degradation of these salts may be deleterious to the activity of the cracking catalyst. Consequently, the halogen and sulfate salts are used, preferably, in combination with supports which are substantially inert to the cracking of hydrocarbons.

Yttrium and/or inorganic oxide or oxides can be incorporated with a support precursor, such as silica gel, silica alumina gel or alumina gel, prior to spray drying or other physical formation process. Subsequent drying and, if desired, calcination then affords the supported yttrium and inorganic oxide or oxides. In those instances wherein a cracking catalyst is employed as a support, yttrium and/or the inorganic oxide or oxides may be incorporated by coprecipitation of yttrium and/or metal or metals of the inorganic oxide or oxides with catalyst precursors, for example as the metal hydroxides, followed by addition of the zeolite component if any in particulate form, followed by drying and, if desired, calcination.

The process of this invention is particularly effective for removing sulfur oxides from a gas which has a concentration of sulfur oxides of less than about 0.5 volume percent. The process of this invention is also effective, however, for removing sulfur oxides from a gas which has a higher concentration of sulfur oxides up to about 10 volume percent. The process of this invention permits removal from the sulfur oxide containing gas of desirably at least about 50%, preferably at least about 80% and ideally more than about 90% of the sulfur oxides.

The gas from which sulfur oxides are removed need not contain molecular oxygen, but in a preferred embodiment desirably contains an amount of molecular oxygen which is in excess of the stoichiometric amount required to convert any sulfur dioxide present to sulfur trioxide. The excess of oxygen can range from about 0.001 to about 10,000 times the stoichiometric amount which is required to convert any sulfur dioxide to sulfur trioxide. Ordinarily, however, the excess need not be greater than from about 0.001 to about 100 times the stoichiometrically required amount. The excess of molecular oxygen need not be large, but the ability of yttrium-inorganic oxide absorbent of this invention to absorb sulfur dioxide is improved as the amount of excess molecular oxygen increases. Although the reason for this effect by molecular oxygen is uncertain, it is believed that increased concentrations of oxygen promote the conversion of sulfur dioxide to sulfur trioxide in accordance with the law of mass action. It is further believed that this sulfur trioxide is more easily absorbed by the yttrium-inorganic oxide absorbent than is the sulfur dioxide. The molecular oxygen can either be inherently present in the sulfur oxide containing gas or can be added thereto.

The absorption of sulfur oxides with yttrium-inorganic oxide absorbent of this invention is desirably carried out at a temperature below about 900° C., preferably at a temperature from about 100° to about 900° C. and most preferably at a temperature from about 300° to about 800° C.

The removal of absorbed sulfur oxides from the yttrium-inorganic oxide absorbent of this invention is accomplished by contacting the spent absorbent with a hydrocarbon in the presence of a hydrocarbon cracking catalyst at an elevated temperature. This temperature is desirably from about 375° to about 900° C., preferably from about 430° C. to about 700° C. and most preferably from about 450° to about 650° C.

The temperature at which the sulfur oxides are absorbed by and removed from the yttrium-inorganic oxide absorbent must, of course, be lower than that which will cause substantial thermal deactivation of the cracking catalyst. Consequently acid treated clays cannot ordinarily be used at temperatures much above about 650° C., whereas many zeolite-type cracking catalysts can be used at temperatures of 750° C. and above. By way of example, hydrocarbon cracking catalysts containing ultrastable zeolites are stable at temperatures in excess of 1000° C.

Any hydrocarbon can be used to remove the absorbed sulfur oxides from the yttrium-inorganic oxide of this invention so long as it can be cracked by the cracking catalyst at the temperatures employed. Suitable hydrocarbons include, but are not limited to, methane, natural gas, natural gas liquids, naphtha, light gas oils, heavy gas oils, wide-cut gas oils, vacuum gas oils, decanted oils and reduced crude oils as well as hydrocarbon fractions deried from shale oils, coal liquefaction and the like. Such hydrocarbons can be employed either singly or in any desired combination.

In a preferred embodiment of the invention, the yttrium-inorganic oxide absorbent is contacted with added steam while it is simultaneously contacted with a hydrocarbon in the presence of the hydrocarbon cracking catalyst. In an alternative embodiment, the yttrium-inorganic oxide absorbent is contacted with steam at a temperature desirably from about 100° to about 900° C. and preferably from about 430° to about 700° C. subsequent to the treatment with a hydrocarbon in the presence of a hydrocarbon cracking catalyst. Such treatment with steam is not necessary, but generally results in an improved removal of absorbed sulfur oxides. The amount of steam employed is desirably equal to or greater on a more basis than the amount of sulfur oxides absorbent by the yttrium-inorganic oxide absorbent. The amount of added steam can range, on a mole basis, from about 1.0 to about 10,000, preferably from about 1.0 to about 1,000, and more preferably from about 1.0 to about 100 times the amount of sulfur oxides absorbed by the absorbent.

Although the invention disclosed herein is not to be so limited, it is believed that chemical reaction occurs between the yttrium-inorganic oxide absorbent and the sulfur oxides which results in the formation of nonvolatile inorganic sulfur compounds, such as sulfides and sulfates. This chemical reaction is reversible and can be summarized in a simplified manner by the following equations:

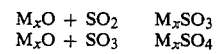

where x is the ratio of the oxidation state of the oxide ion to the oxidation state of a metal component M of the yttrium-inorganic oxide absorbent when combined with oxygen. At very high temperatures, these sulfites and sulfates can undergo partial decomposition to liberate the original sulfur oxides and absorbent. As a consequence of this reversal of the sulfur oxide absorption at high temperature, the absorption of sulfur oxides is desirably effected at a temperature below about 900° C. and preferably below about 800° C.

The precise mechanism by which absorbed sulfur oxides are removed from the yttrium-inorganic oxide absorbent of this invention is unknown, but it is believed that the combination of hydrocarbon and hydrocarbon cracking catalyst at elevated temperatures provides a reducing environment which effects a conversion of absorbed sulfur oxides to hydrogen sulfide while simultaneously reactivating the absorbent for further absorption of sulfur oxides. Although the invention is not to be so limited, it is believed that the removal of absorbed sulfur oxides can be summarized in a simplified manner by the following equations:

$$M_xSO_3 + 3H_2 \quad M_xO + H_2S + 2H_2O \quad (a)$$
$$M_xSO_4 + 4H_2 \quad M_xO + H_2S + 3H_2O \quad (b)$$
$$M_xSO_4 + H_2 \quad M_xO + SO_2 + H_2O$$
$$M_xSO_3 + 3H_2 \quad M_xS + 3H_2O \; M_xO + H_2S + 2H_2O \quad (c)$$
$$M_xSO_4 + 4H_2 \quad M_xS + 4H_2O \; M_xO + H_2S + 3H_2O \quad (d)$$

where x is the ratio of the oxidation state of the oxide ion to the oxidation state of a metal component M of the yttrium-inorganic oxide absorbent when combined with oxygen. The removal of absorbed sulfur oxides from the absorbent is generally improved by contacting the absorbent with added steam either simultaneously with or subsequent to treatment with a hydrocarbon in the presence of a cracking catalyst. It is believed that at least some metal sulfide is formed according to equations (c) and (d) above and that added steam serves to promote the conversion of these metal sulfides to hydrogen sulfide with simultaneous reactivation of the absorbent.

The hydrogen sulfide and/or sulfur oxide which is produced during the removal of absorbed sulfur oxides from the yttrium-inorganic oxide absorbent can be converted to elemental sulfur by any of the conventional techniques which are well known to the art as, for example, in a Claus unit. Cracked hydrocarbon products which are produced during removal of absorbed sulfur oxides from the absorbent of this invention, after substantial separation of hydrogen sulfide, can be recycled to extinction for further use in removing absorbed sulfur oxides. Alternatively, these cracked hydrocarbon products can be burned directly as a fuel or can be fractionated by conventional techniques to separate more valuable products of lower molecular weight than the initial hydrocarbon employed.

A highly preferred embodiment of this invention comprises its use to reduce sulfur oxide emissions from catalyst regeneration in a cyclic, fluidized, catalytic cracking process. In this embodiment, the yttrium-inorganic oxide absorbent is circulated through the fluidized catalytic cracking process in association with the particulate cracking catalyst.

When the process of this invention is employed in a fluidized catalytic cracking process, the regeneration zone effluent gases desirable contain at least about 0.01 volume percent, preferably at least about 0.5 volume percent, more preferaby at least about 1.0 volume percent and ideally at least about 2.0 volume percent of molecular oxygen. In addition, the combination of yttrium and inorganic oxide or oxides is preferably used in sufficient amount to effect the absorption of at least about 50%, more preferably at least about 80% and ideally more than about 90% of the sulfur oxides produced in the regeneration zone by the combustion of coke. As a result, the concentration of sulfur oxides in the regeneration zone effluent gas stream can be maintained at less than about 600 parts per million by volume (ppmv), advantageously less than about 200 ppmv and more advantageously at less than about 100 ppmv. In conventional fluidized catalytic cracking processes which do not employ the process of this invention, the cracking of high-sulfur feedstocks often results in the formation of a regeneration zone effluent gas stream which contains 1200 ppmv or more of sulfur oxides.

This invention is highly suitable for use in reducing emissions of sulfur oxides from the regenerator of a fluidized catalytic cracking unit since the yttrium or yttrium with rare earth metals and inorganic oxides of the invention have little or no adverse effect on the yield of desirable low molecular weight hydrocarbon products from hydrocarbon cracking.

With further reference to the use of this invention to reduce regeneration zone sulfur oxide emissions in a fluidized catalytic cracking process, the yttrium or yttrium with rare earth metal or metals and inorganic oxide or oxides can be deposited on a suitable support by introducing yttrium and/or one or more precursors of the inorganic oxide or oxides into the fluidized catalytic cracking process cycle and thereby depositing yttrium, a selected rare earth metal if desired, and/or inorganic oxide or oxides onto the support in situ. In this embodiment, the support will comprise cracking catalyst. The yttrium, rare earth metal compound or inorganic oxide precursor can be introduced as an aqueous or organic solution or dispersion, or in the solid, liquid or gaseous state at any stage of the cracking process cycle which comprises the cracking reaction zone, the stripping zone and the regeneration zone. For example, such compound or precursor can be admixed either with the feedstock or fluidizing gas in the reaction zone, with the regeneration gas torch oil or water in the regeneration zone, or with the stripping gas in the stripping zone, or can be introduced as a separate stream. Suitable compounds or precursors for in situ incorporation include, but are not limited to, inorganic metal salts such as nitrates and carbonates, organometallic compounds, metal diketonates, and metal carboxylates of from 1 to 20 carbon atoms.

A particularly suitable embodiment of the invention for use in a fluidized catalytic cracking process involves the circulation through the process cycle in admixture with the cracking catalyst of a particulate solid other than cracking catalyst which comprises at least one inorganic oxide selected from the group consisting of the oxides of aluminum, magnesium, zinc, titanium and calcium in association with ytzrium; wherein the ratio by weight of inorganic oxide or oxides to yttrium is preferably from about 1.0 to about 1,000, more preferably from about 2.0 to about 100, and most preferably from about 3.0 to about 20; and wherein the particulate solid other than cracking catalyst preferably contains at least about 40 weight percent and more preferably at least about 60 weight percent of the inorganic oxide or oxides. At least one free or combined rare earth metal may be included with the yttrium, for example cerium or lanathum. In a particularly preferred version of this embodiment, the particles other than cracking catalyst comprise a fluidizable high surface area particulate alumina upon or into which yttrium or yttrium with the rare earth metal or metals are deposited or incorporated. The particulate composition formed by mixing the cracking catalyst and particulate solid other than cracking catalyst comprises an amount of cracking catalyst which is desirably from about 50 to about 99.9 weight percent, preferably from about 70 to about 99.5 percent, and more preferably from about 90 to about 99.5 weight percent based on the total mixture. Conversely, the composition comprises an amount of particulate solid other than cracking catalyst which is desirably from about 0.1 to about 50 weight percent, preferably from about 0.5 to about 30 weight percent, and more preferably from about 0.5 to about 10 weight percent based on the total mixture.

Another embodiment of the invention for use in a fluidized catalytic cracking process involves the circulation through the process cycle in admixture with the particulate cracking catalyst of (a) a first particulate solid other than cracking catalyst which comprises at least about 50 weight percent of one or more inorganic oxides selected from the group consisting of the oxides of aluminum, magnesium, zinc, titanium and calcium and (b) a second particulate solid (other than cracking catalyst) which comprises yttrium. In this embodiment, the ratio by weight of the inorganic oxide of oxides of the first particulate solid to yttrium of the second particulate solid is preferably from about 1.0 to about 1,000 and more preferably from about 2.0 to about 100. In addition, the composition formed by mixing the cracking catalyst and particulate solids other than cracking catalyst comprises an amount of cracking catalyst which is desirably from about 50 to about 99.9 weight percent, preferably from about 70 to about 99.5 weight percent, and most preferably from about 90 to about 99.5 weight percent based on the total mixture. Particulate yttrium, cerium oxide, lanthanum oxide and mixtures of rare earth oxides are highly suitable for use as the second particulate solid other than cracking catalyst. Particulate alumina, especially gamma-alumina, and particulate solids comprising alumina are highly suitable for use as the first particulate solid other than cracking catalyst. Further, this particulate solid can be impregnated with the oxide of yttrium and the rare earth metals and, then combined with the cracking catalyst during the manufacture of the cracking catalyst, such as prior to spray drying.

Another particularly suitable embodiment of the invention for use in a fluidized catalytic cracking process involves the use of a cracking catalyst in the process which is prepared by the steps comprising (a) impregnating a particulate solid cracking catalyst comprising from about 0.5 to about 50 weight percent of a crystalline aluminosilicate zeolite distributed throughout a porous matrix comprised of from about 40 to about 100 weight percent of alumina and from about 0 to 60 weight percent of silica with yttrium, wherein the amount of said yttrium is sufficient to add from about 0.004 to about 10 weight percent yttrium, calculated as the metal or metals, to the particles of cracking catalyst and (b) calcining the impregnated catalyst particles of a temperature between about 200° and about 820° C. Preferably, the catalyst matrix has a high alumina content and comprises in excess of about 50 weight percent, more preferably in excess of about 60 weight percent, and ideally in excess of about 70 weight percent of alumina. The particulate cracking catalyst is preferably impregnated with sufficient yttrium to add from about 0.1 to 5 weight percent metal or metals, calculated as the metal or metals, to said catalyst particles. Also, cerium and lanthanum of the rare earth compounds can be used in impregnating the cracking catalyst. The rare earth metal or metals added by impregnation are in addition to any rare earth metal or metals which may be present in the crystalline aluminosilicate zeolite as a consequence of ion exchange with rare earth metals.

The following examples are intended only to illustrate the invention and are not to be construed as imposing any limitations on the invention.

EXAMPLE 1

A particulate alpha alumina monohydrate (CATAPAL-SB obtained from the Conoco Chemicals division of Continental Oil Company) having an analysis of 74.2 percent $Al_2O_3$, 0.008 percent $SiO_2$, 0.005 percent $Fe_2O_3$, 0.004 percent $Na_2O$, and less than 0.01 percent sulfur, having a bulk density in the range from 660 to 740 grams per liter, and with 78 percent by weight of the particles having a size less than 90 microns, was calcined at 1000° F. for three hours. The alpha alumina was transformed to a gamma-alumina. Thereafter, 40.8 grams of this gamma-alumina was impregnated with an aqueous solution prepared by 19.5 grams yttrium nitrate $[Y(NO_3)_3.6H_2O]$ in 50 milliliters of distilled water at room temperature. This impregnated gamma-alumina was then dried at 250° F. overnight and calcined at 1200° F. of three hours to give a particulate gamma-alumina having 10.0 weight percent of yttrium deposited thereupon. The gamma-alumina prior to being used in any test was steamed in 100 percent steam for five hours at 1400° F. in a fluidized bed.

EXAMPLE 2

A particulate alpha alumina monohydrate (CATAPAL-SB, obtained from the Conoco Chemicals division of Continental Oil Company) having the properties described in Example 1 was calcined at 1000° F. for three hours. The alpha alumina was transformed to a gamma-alumina. Thereafter, 40.0 grams of this gamma-alumina was impregnated with 8.5 grams of yttrium nitrate and 15.9 grams of cericammonium nitrate $[(NH_4)_2Ce(NO_3)_6]$ in enough distilled water at room temperature to make 60 milliliters of solution. This impregnated gamma-alumina was then dried at 250° F. overnight and calcined at 1000° F. for three hours to give a particulate gamma-alumina having 5 weight percent of yttrium and 5 weight percent of cerium deposited thereupon.

EXAMPLE 3

A particulate alpha alumina monohydrate (CATAPAL-SB, obtained from the Conoco Chemicals division of Continental Oil Company (having the properties described in Example 1)) was calcined at 540° C. for three hours to produce a particulate gamma-alumina. A solution of 7.1 grams of cerous nitrate $[Ce(NO_3)_3.6H_2O]$ in 25 milliliters of distilled water was used to impregnate 20.6 grams of the particulate gamma-alumina. The impregated gamma-alumina was then dried at 120° C. for three hours to give a particulate gamma-alumina which contained 10.0 weight percent of cerium.

EXAMPLE 4

A fixed bed test was conducted using a catalytic cracking catalyst (CBZ-1 obtained from Davison Chemical division of W. R. Grace and Company) having the following properties: 29.1 weight percent $Al_2O_3$, 0.46 weight percent $Na_2O$, and 0.11 weight percent Fe, with a surface area of 340 square meters per gram, pore volume of 0.60 cubic centimeters per gram and an apparent bulk density of 0.47. The catalyst was steamed at 100 percent steam for five hours at 1400° F. in a fludized bed prior to testing. One gram of the catalyst was placed in a reactor tube and a thermocouple was installed within the reactor tube and connected to the necessary monitoring equipment. The reactor tube was then placed in a furnace. Helium was flowed through the reactor tube and the catalyst bed, and after the desired temperature in the reactor tube was reached, the reactor tube was purged for one hour. $SO_2$ was then injected into the reactor tube for 92 minutes. The amount of $SO_2$ exiting from the tube was measured. At the end of the run, the catalyst was removed and analyzed to determine the amount of $SO_2$ absorbed thereon.

EXAMPLE 5

A series of tests in accordance with Example 4 were conducted utilizing increasing amounts of 10 percent Ce/alumina, prepared in Example 3, as an additive with the catalyst.

EXAMPLE 6

A series of tests in accordance with Example 4 were conducted utilizing increasing amounts of 5 percent Y plus 5 percent Ce/alumina, prepared in Example 2, as an additive with the catalyst.

EXAMPLE 7

A series of tests in accordance with Example 4 were conducted utilizing increasing amounts of 10 percent Y/alumina, prepared in Example 1, as an additive with the catalyst.

The test results from Examples 5, 6, and 7 are plotted in FIG. 1 and indicates the amount of $SO_2$ absorbed per amount of additive utilized.

EXAMPLE 8

A fluidized bed test was conducted utilizing a catalytic cracking catalyst (CBZ-1 obtained from the Davison Chemicals division of W. R. Grace Company) and having the same properties as described in Example 4. The ability of the catalyst and any additives present to absorb $SO_2$ is tested by passing a synthetic flue gas over the catalyst. The synthetic flue gas is composed of oxygen, nitrogen, sulfur dioxide, and moisture. The synthetic flue gas is passed directly to a $SO_2$ analyzer and a wet meter test. Rotameters are installed and adjusted to obtain the desired $SO_2$ inlet concentration and total flow rate. A reactor tube containing a catalyst is heated to a desired temperature, approximately 750° C., and the synthetic flue gas is directed to flow through the reactor tube where part of the $SO_2$ is absorbed by the catalyst. The $SO_2$ concentration in the effluent from the reactor tube is monitored continuously by the $SO_2$ analyzer to determine the amount of $SO_2$ absorbed.

EXAMPLE 9

An $SO_2$ absorption test is conducted in accordance with Example 8 utilizing the catalyst with 5 percent of an additives, the additive being 10 percent Y/alumina prepared in Example 1.

EXAMPLE 10

An $SO_2$ absorption test is conducted in accordance with Example 8 utilizing the catalyst with 6 percent of an additive, the additive being 10 percent Y/alumina prepared in Example 1.

Figure 2:
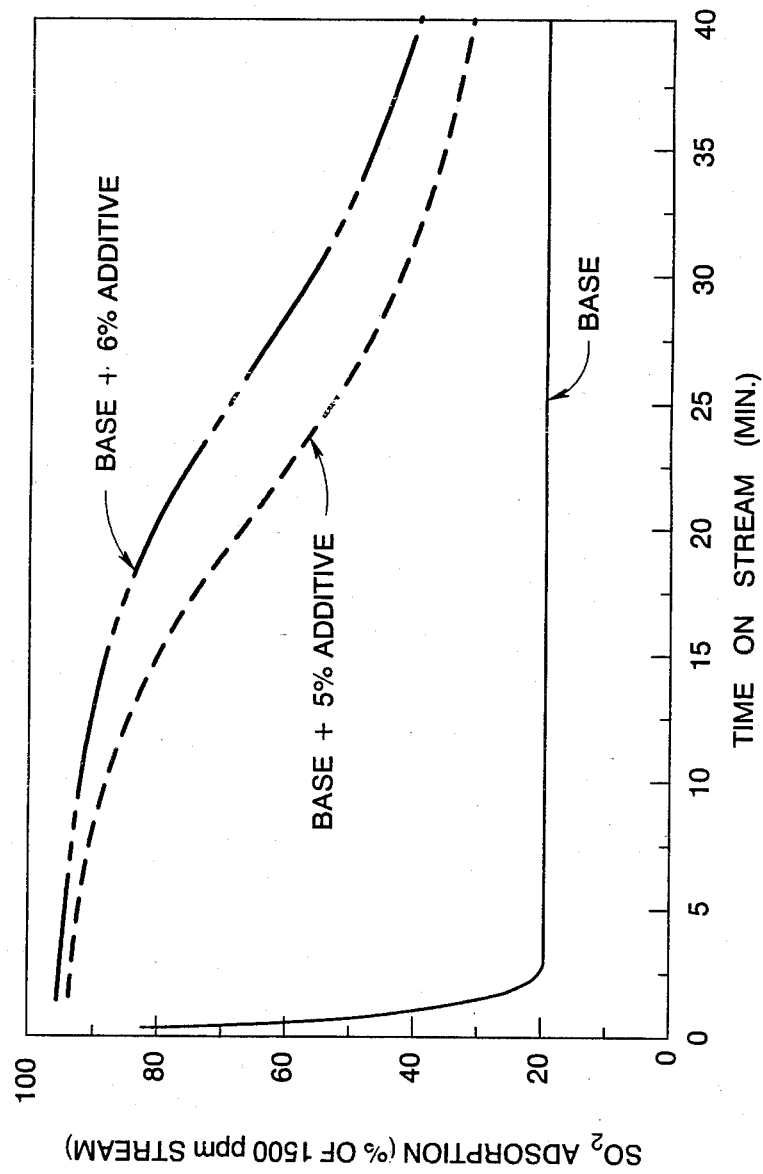
FIG. 2 is a graphical representation of the amount of SO$_2$ absorbed per unit of time for various concentrations of additives.

The test results from Examples 8, 9, and 10 are plotted in FIG. 2 and indicate the $SO_2$ absorption versus time.

Wherein the invention has been described in particular relation to the drawings and examples herein, it should be understood that other and further inventions, apart from those shown or suggested herein, may be made within the scope and spirit of this invention.

What is claimed is:

1. A composition of matter prepared by the steps comprising:
   (a) impregnating a particulate solid cracking catalyst comprising from about 0.5 to about 50 weight percent of a crystalline aluminosilicate zeolite distributed throughout a matrix consisting essentially of from about 40 to about 100 weight percent of alumina and from about 0 to about 60 weight percent of silica with an oxide of yttrium wherein the amount of said oxide of yttrium is sufficient to add from about 0.004 to about 10 weight percent of yttrium, calculated as the oxide of yttrium, to said catalyst particles; and
   (b) calcining said impregnated catalyst particles at a temperature between about 200° and about 820° C.

2. A composition of matter as in claim 1 including from about 0 to about 60 weight percent of silica with an oxide of yttrium and at least one rare earth metal compound selected from the group consisting of the compounds of lanthanum, cerium, praseodyium, samarium, and dysprosium.

3. The composition as set forth in claim 1 wherein said matrix consists essentially of from about 60 to about 100 weight percent of alumina.

4. The composition as set forth in claim 1 wherein said matrix is composed of from about 70 to about 100 weight percent of alumina.

5. The composition as set forth in claim 1 wherein the amount of said oxide of yttrium is sufficient to add from about 0.1 to about 5 weight percent oxide of yttrium, calculated as the oxide of yttrium, to the catalyst particles.

6. The composition as set forth in claim 1 wherein an oxide of yttrium is used to impregnate said cracking catalyst.

7. A composition of matter comprising a particulate physical mixture of:
   (a) a particulate solid cracking catalyst for cracking hydrocarbons comprising a crystalline aluminosilicate zeolite distributed throughout a matrix; and
   (b) a particulate solid other than said cracking catalyst comprising an inorganic aluminum oxide in association with an oxide of yttrium, wherein the particulate solid other than said cracking catalyst contains at least about 40 weight percent of said inorganic aluminum oxide, the ratio by weight of inorganic aluminum oxide to oxide of yttrium is from about 1.0 to about 1000, and said particulate solid other than said cracking catalyst comprises from about 0.1 to about 50 weight percent of said particulate physical mixture.

8. A composition of matter prepared by the steps comprising:
   (a) impregnating a particulate solid comprising an inorganic oxide of aluminum with an oxide of yttrium, wherein the particulate solid contains at least about 40 weight percent of said inorganic aluminum oxide and the ratio by weight of inorganic aluminum oxide to oxide of yttrium is from about 1.0 to about 1000;
   (b) calcining the impregnated particulate solid with a particulate solid cracking catalyst for hydrocarbons comprising a crystalline aluminosilicate zeolite distributed through a matrix during the manufacture of the cracking catalyst.

9. The composition as in claim 7 or 8 wherein said inorganic oxide is in association with an oxide of yttrium and at least one free or combined rare earth metal selected from the group consisting of lanthanum, cerium, praseodyium, samarium and dysprosium.

10. The composition as set forth in claim 7 or 8 wherein said inorganic oxide comprises alumina.

11. The composition as set forth in claim 9 or 10 wherein said alumina comprises gamma-alumina.

12. The composition as set forth in claim 7 or 8 wherein said inorganic oxide comprises a mixture of alumina and magnesium oxide, and the weight ratio of alumina to magnesium oxide is from about 2.0 to about 100.

13. The composition as set forth in claim 7 or 8 wherein the ratio by weight of inorganic oxide or oxides to the oxide of yttrium is from about 2.0 to about 100.

14. The composition as set forth in claim 7 or 8 wherein the ratio by weight of inorganic oxide or oxides to the oxide of yttrium is from about 3.0 to about 20.

15. The composition as set forth in claim 7 or 8 wherein the particulate solid other than cracking catalyst comprises from about 0.5 to about 10 weight percent of the particulate physical mixture.

* * * * *